United States Patent [19]

O'Brien

[11] 4,040,237
[45] Aug. 9, 1977

[54] SEALING JAW MECHANISM FOR PACKAGE MAKING MACHINE

[75] Inventor: Edward F. O'Brien, Northhampton, Mass.

[73] Assignee: Package Machinery Company, East Longmeadow, Mass.

[21] Appl. No.: 697,626

[22] Filed: June 18, 1976

[51] Int. Cl.² .............................................. B65B 9/10
[52] U.S. Cl. ................................................ 53/180 M
[58] Field of Search ................. 53/180 R, 180 M, 182

[56] References Cited

U.S. PATENT DOCUMENTS

| 3,287,199 | 11/1966 | Virta | 53/182 X |
|---|---|---|---|
| 3,685,250 | 8/1972 | Henry et al. | 53/180 M |

Primary Examiner—Travis S. McGehee
Attorney, Agent, or Firm—McCormick, Paulding & Huber

[57] ABSTRACT

A mechanism for forming heat seals or the like in adjacent layers of web material as part of a package making process carried out by a machine comprises two sealing jaws and a means for slidably supporting and driving the two jaws for movement between relatively opened and closed positions. One jaw is fixed to a slide slidably supported for movement relative to a base along a given slide axis and the other jaw is slidably supported on the slide for slidable movement along the same slide axis. A crank mechanism simultaneously moves both the slide and the other jaw to drive the two jaws in opposite directions toward their open or closed condition, depending on the direction of rotation of the crank. In the jaw closing direction the crank mechanism has a toggle action making available a high clamping force between the jaws and causing the jaws to close smoothly with little or no bouncing or impact.

13 Claims, 6 Drawing Figures

SEALING JAW MECHANISM FOR PACKAGE MAKING MACHINE

BACKGROUND OF THE INVENTION

This invention pertains to machines for making packages from web material, and deals more particularly with a sealing mechanism for use in such a machine for sealing at least two layers of a body of web material to one another as the web material is moved through the machine.

In package making machines, it is quite common to form seals in web material by two sealing jaws which in a seal-making cycle from a relatively open condition move to a closed condition at which the web material is squeezed therebetween. During the closed state of the jaws, the seal may be formed in various different ways as by applying heat from one or the other or both of the jaws to a heat sealable web material, by applying the pressure of the jaws to a pressure sensitive web material, or by applying clips, staples, bands, adhesive strips or other fasteners to the material. The present invention concerns primarily an apparatus or mechanism for operating such sealing jaws and may be used in various different types of package making machines and for making various different forms of seals. By way of example, the mechanism as shown herein is part of a vertical forming, filling and sealing packaging machine for making package end seals, but it will be understood that the invention in its broader aspects is not limited to this particular application.

The general object of this invention is to provide a sealing mechanism for a web fed package making machine including two sealing jaws capable of being cyclicly moved between opened and closed conditions and which sealing mechanism is of a simple, low cost and reliable construction.

A further object of the invention is to provide a sealing mechanism wherein the sealing jaws are moved smoothly into their closed condition and in such closed condition are held against reverse or opening movement by an extremely high force.

Another object of the invention is to provide a jaw-type sealing mechanism for a package making machine wherein a crank and connecting link is used to drive the two jaws between their opened and closed conditions and wherein the parts of such driving arrangement are of relatively small size and located so as to be generally out of the way with regard to the machine operator thereby making the associated sealing station of the machine readily open and accessible to the operator.

Another object of the invention is to provide a sealing mechanism of the foregoing character which easily may be made as a module that can be removed from the machine and replaced by another similar module or that can be shifted to different positions relative to the remainder of the machine as, for example, to vary the length of product drop in accordance with changes in the length of the packages being made.

Another object of this invention is to provide a sealing mechanism as described above wherein both of the sealing jaws are movable relative to the frame of the associated machine and when closed meet at the center line of the path of movement of the web through the mechanism so that the web material upon closing of the jaws is not deflected to one side or the other of its normal path.

A still further object of the invention is to provide a sealing mechanism of the foregoing character which may be used either as a stationary unit with the web material being fed by the other means therethrough or which may be designed as a reciprocating unit for additional use in pulling or aiding in pulling the web material through the machine.

Other objects and advantages of the invention will be apparent from the following description and from the drawings and claims forming a part hereof.

SUMMARY OF THE INVENTION

This invention resides in a sealing mechanism for a machine for making packages from web material wherein two jaws are slidably supported for movement relative to one another between open and closed positions and are driven in their sliding movement by a crank and link arrangement. One jaw is carried by a slide supported for sliding movement along a given axis relative to a base, and the other jaw is slidably supported for sliding movement relative to the slide along the same given axis. The crank and link arrangement for moving the jaws includes two crank arms fixed to one another and supported for pivotal movement in unison about a crank axis generally perpendicular to the axis of sliding motion. A first connecting link is connected between one of the crank arms and the slide and a second connecting link is connected between the other of the crank arms and the other jaw. The point at which the first connecting link is connected to the one crank arm and the point at which the second connecting link is connected to the other crank arm are located on opposite sides of the crank axis so that when the crank arms are rotated about the crank axis the slide and the other jaw are slidably moved in opposite directions along the given axis. The crank axis and the pivotal connections between the cranks and the connecting links and between the connecting links and the slide and the other jaw are preferably so arranged that as the jaws are moved to their closed condition a toggle action is obtained whereby the jaws meet one another with substantially zero velocity and are held closed even against relatively large forces tending to move them from the closed condition.

DETAILED DESCRIPTION OF THE PREFERRED EMBODIMENT

Figure 1:
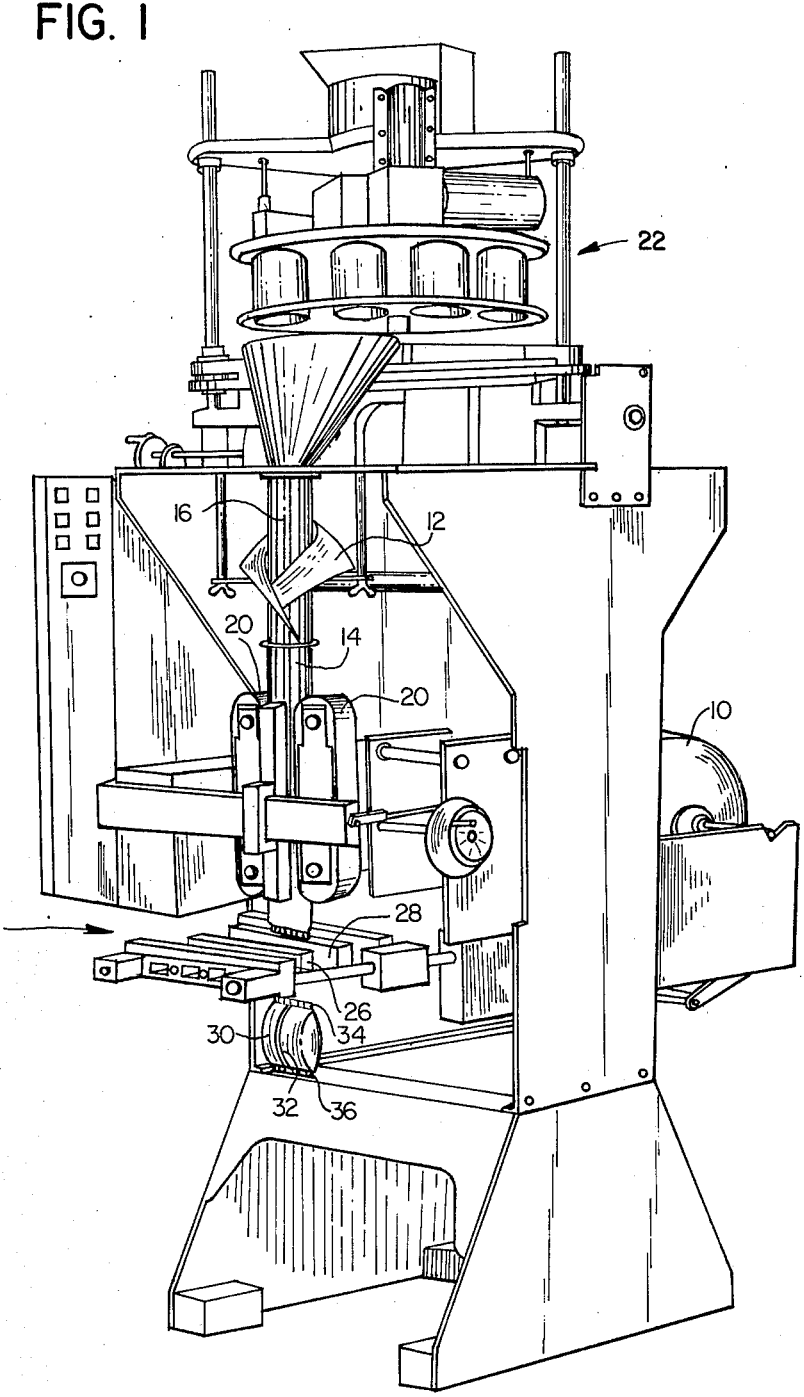
FIG. 1 is a perspective view of a vertical form, fill and seal packaging machine using a stationary end sealing mechanism embodying this invention.

FIG. 1 shows a package making machine having a sealing mechanism embodying this invention and which machine is of the type generally referred to as a vertical form, fill and seal machine. A heat sealable web material is supplied from a roll 10 thereof and is guided to a former 12, located at the upper end of the machine, which folds the flat web material into a vertically oriented tube 14 surrounding a tubular filling mandrel or pipe 16. The edges of the folded web material overlap one another, and as the folded tube moves downwardly over the mandrel 16, the overlapped marginal edge portions are heat sealed to one another by a cyclicly operated longitudinal sealing mechanism 18. The web material is advanced through the machine by a pair of intermittently operated vacuum feed belts 20, 20 located on opposite sides of the web tube 14.

As packages are formed by the machine of FIG. 1, product is also filled into them by a feeder mechanism 22. The mechanism 22 is located on top of the machine, is driven in synchronsim with the remainder of the machine, and cyclicly discharges measured quantities or charges of product into the upper end of the filling mandrel 16.

The transverse or end sealing mechanism of the FIG. 1 machine is indicated generally at 24 and forms package end seals in the web tube 14 by cyclicly flattening the tube and heat sealing the two layers of the flattened tube to one another through the use of two relatively moving jaws 26 and 28. A filled and finished package issuing from the machine is indicated at 30. The longitudinal seal formed by the longitudinal sealing mechanism 18 is indicated at 32 and the packages' top and bottom end seals are shown at 34 and 36, respectively. During one closing movement of the jaws 26 and 28, the sealing mechanism 24 simultaneously forms the top end seal of the leading package and the bottom end seal of the following package, and it also cuts the web material between the two seals to separate the leading package from the web tube. Vertical movement of the web tube 14 is stopped, by stopping the feed belts 20, 20 while the jaws are closed. Between successive operations of the jaws, the web tube is advanced by the feed belts and a charge of product is loaded into the web tube by the product feeder mechanism 22.

In the machine of FIG. 1, the transverse or end sealing mechanism 24 is fixed vertically relative to the frame of the machine and the folded and longitudinally sealed web tube 14 is fed downwardly through it by the vacuum feed belts 20, 20. In some other prior art designs of vertical form, fill and seal machines, however, the end sealing mechanism is reciprocated vertically and used to pull or to aid in pulling the web material through the machine. The use of a stationary end sealing mechanism in combination with a separate web feed device has certain advantages such as allowing the making of long length bags and enabling the vertical heighth of the overall machine to be minimized. However, it should be understood that the sealing mechanism 24 is not limited to stationary operation and if desired, may be used in other machines wherein it is made to reciprocate vertically to pull or to aid in pulling the web material through the machine. Also, as will hereinafter be evident, the sealing mechanism 24 is driven by an hydraulic cylinder, or similar motor, forming an integral part of the mechanism and, except for pressure fluid lines connected to the cylinder, it is not drivingly connected to any other part of the machine. Therefore, the sealing mechanism may be made, if desired, as a module readily removable from the machine and replaceable by a similar module or movable to different positions on the machine frame.

Figure 2:
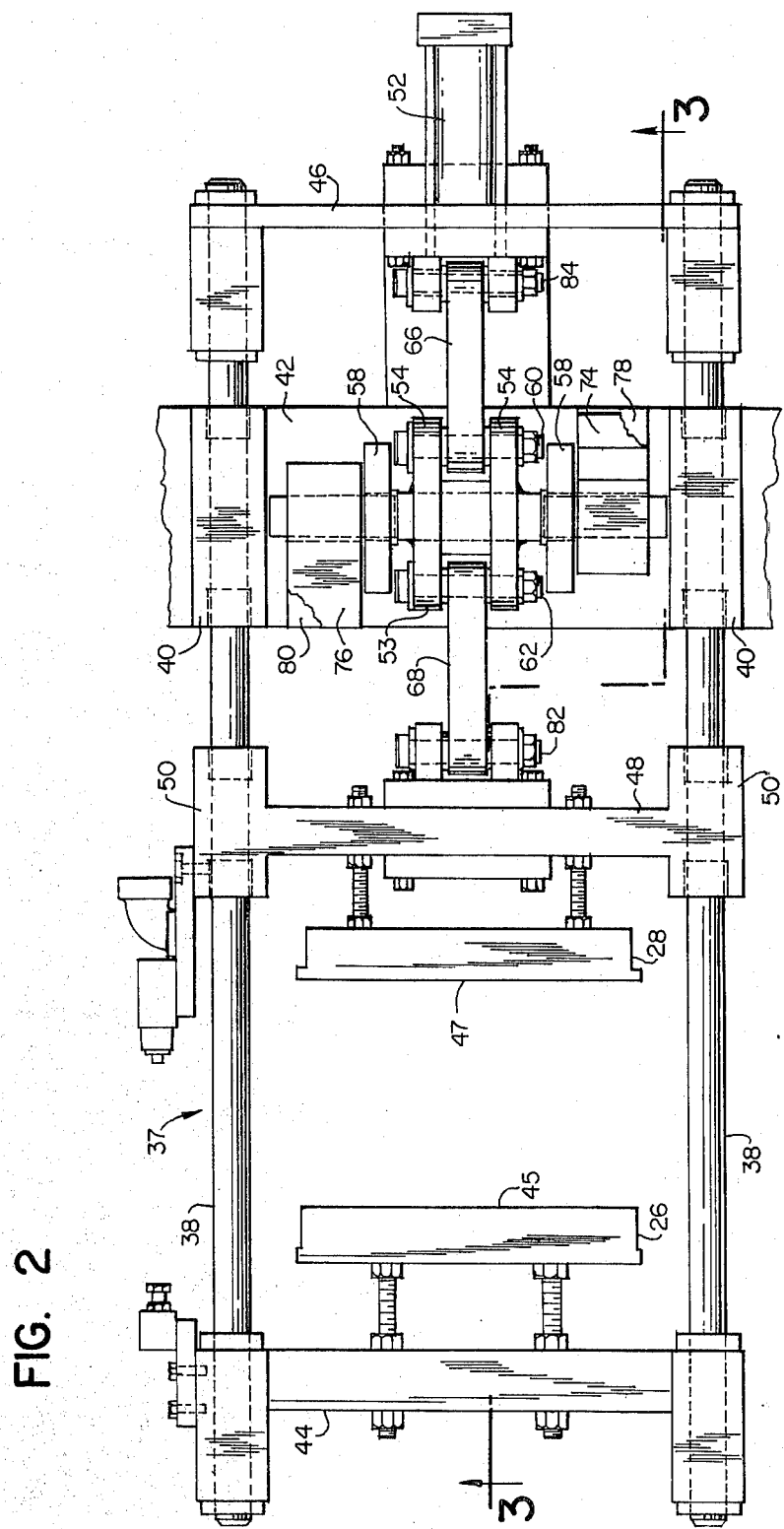
FIG. 2 is a plan view of the sealing mechanism of the machine of FIG. 1.
Figure 3:
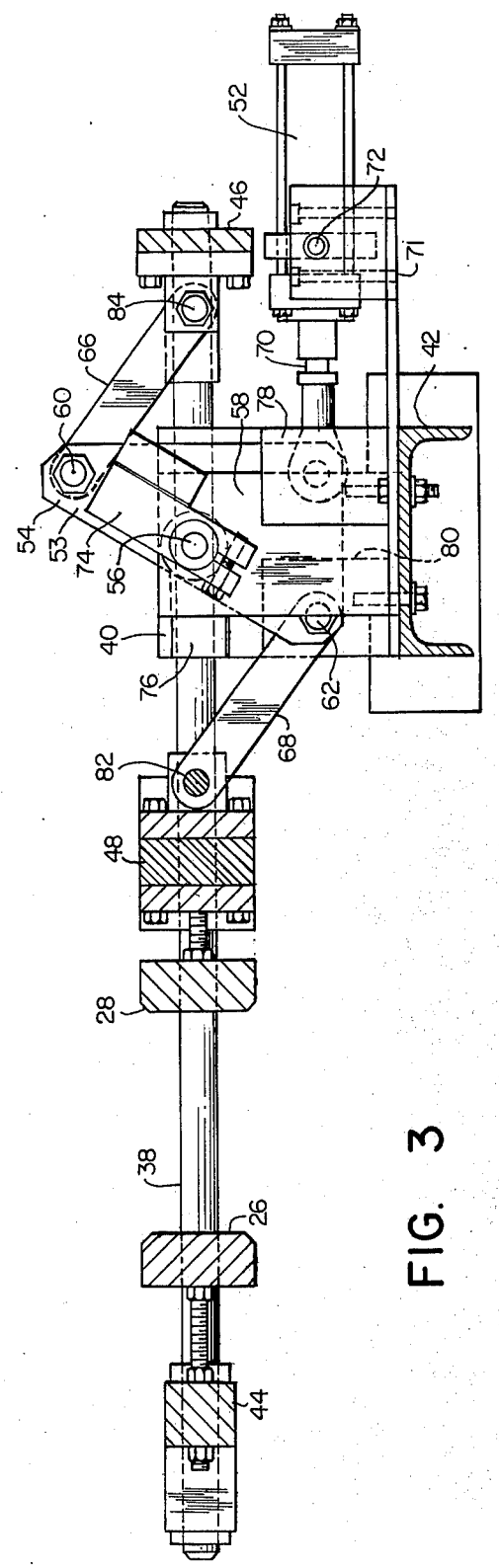
FIG. 3 is a side view, partly in elevation and partly in section, of the sealing mechanism of FIG. 2 taken generally on the line 3—3 of FIG. 2.

FIGS. 2 and 3 show the actual construction of the sealing mechanism 24 of FIG. 1, and FIGS. 4, 5 and 6 show the same mechanism in a simplified and schematic form by which its operation may be more readily understood. Referring to these figures, the illustrated mechanism includes a slide 37 supported for reciprocating sliding movement relative to the frame of the machine along a horizontal axis. As seen in FIG. 2, the slide consists of two parallel rods 38, 38, a front crosspiece 44 and a rear crosspiece 46. Each of the two rods is slidably supported for movement along its longitudinal axis by an associated bearing block 40 fixed to a base 42 in turn fixed to the frame of the machine. At their front or left-hand ends, the two rods 38, 38 are joined by the front crosspiece 44 which is fixed to both of the rods for movement therewith and which carries the front jaw 26 with its sealing face 45 facing rearwardly or toward the rear jaw 28. At their rear or right-hand ends the rods are also joined by the rear crosspiece 46 fixed to the rods for movement therewith.

Slidably supported on the rods 38, 38 is an intermediate crosspiece 48 having bearing equipped sleeves 50, 50 at its opposite ends for slidable engagement with the rods. The intermediate crosspiece 48 is located between the bearing blocks 40, 40 and the front crosspiece 44 and carries the rear jaw 28 with its sealing face 47 facing forwardly or toward the front jaw 26.

The slide 37 and the intermediate crosspiece 48 are driven simultaneously in opposite directions by a crank and link arrangement powered by a double acting hydraulic cylinder 52. The crank 53 is comprised of two spaced crank plates 54, 54 fixed to a crank shaft 56 rotatably supported by two posts 58, 58 fixed to the base 42. The crank shaft 56 is oriented perpendicular to the axis of sliding movement of the slide 37 and further, as shown in FIG. 3, is located on the same vertical level as the slide rods 38, 38 so that its axis intersects the longitudinal axes of the rods. The two crank plates 54, 54 as seen best in FIG. 3, carry three pivot pins providing three pivot points 60, 62 and 64 and in effect provide three crank arms fixed to the crank shaft 56. The first of these crank arms extends from the crank shaft 56 to the first pivot point 60, the second crank arm extends from the crank shaft to the pivot point 62 and the third crank arm extends from the crank shaft to the pivot point 64.

A first connecting link 66 is connected between the pivot point 60 and the rear crosspiece 46, and a second connecting link 68 is connected between the second pivot point 62 and the intermediate crosspiece 48. The piston rod 70 of the hydraulic cylinder 52 is connected to the crank plates at the pivot point 64. The body of the cylinder 52 is attached to the base 42 by a supporting structure 71 which allows it to pivotally move about a transverse axis 72 parallel to the axis of the crank shaft 56.

A pair of stops 74 and 76 are also fixed to the crank shaft 56. The stop 74 cooperates with a stop block 78 mounted on the base 42 and likewise the stop 76 cooperates with another stop block 80 mounted on the base. The stop 76 is engageable with the stop block 80, as seen in FIG. 3, to limit rotation of the crank plates 54, 54 in the counterclockwise or jaw opening direction. In a similar manner, the stop 74 is engageable with the stop block 78 to limit rotation of the crank plates in the clockwise or jaw closing direction.

Figure 4:
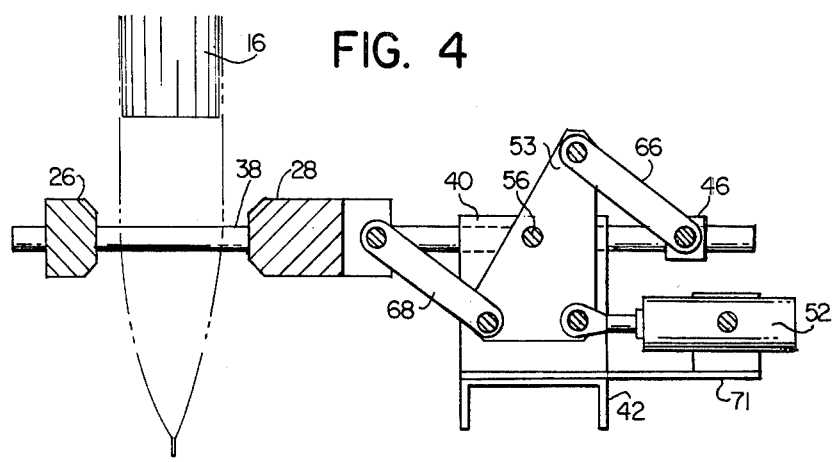
FIG. 4 is a schematic side view of the sealing mechanism of the machine of FIG. 1 with this view showing the mechanism with its jaws in their open condition.
Figure 5:
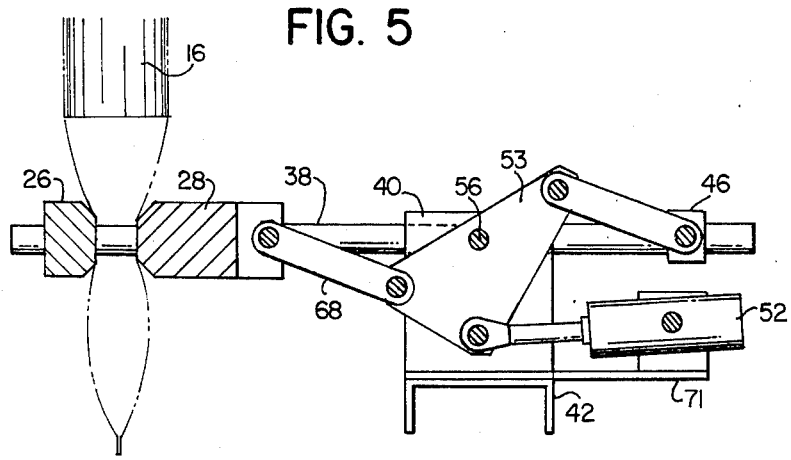
FIG. 5 is a schematic view similar to FIG. 4 but showing the jaws mid-way between their open and closed conditions.
Figure 6:
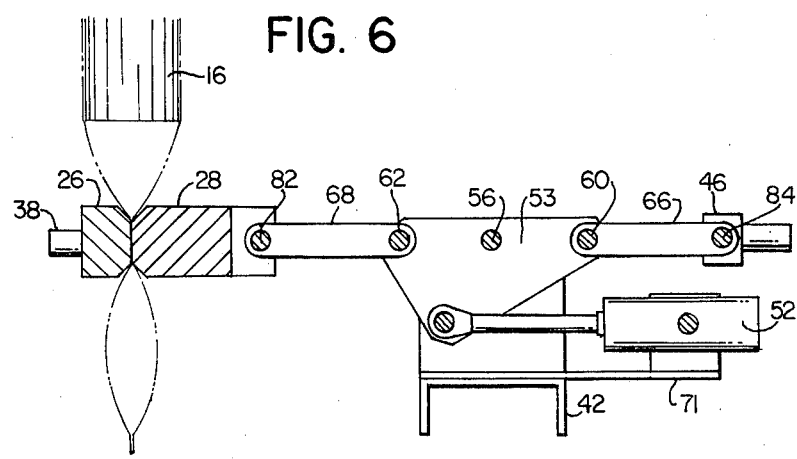
FIG. 6 is a view similar to FIG. 4 but showing the jaws in their closed condition.

The operation of the crank mechanism in moving the jaws between their open and closed conditions may be best understood by reference to the schematic showings of FIGS. 4, 5 and 6. In FIG. 4, the parts are shown with the jaws 26 and 28 in their open condition. From this condition, the jaws may be moved to their closed condition of FIG. 6 by energizing the cylinder 52 to extend its rod 70 and rotate the crank 53 in the clockwise direction. That is, as the crank 53 is rotated in the counterclockwise direction from the position of FIG. 4, the connecting link 66 drives the slide 37 to the right and the connecting link 68 drives the intermediate crosspiece 48 to the left to move the two jaws 26 and 28 toward one another. FIG. 5 shows the two jaws midway between their open and closed conditions; FIG. 6 shows them in their fully closed condition. In the fully closed condition of FIG. 6, it will be noted that the axis of the crank shaft 56, the two pivot points 60 and 62, the pivot point 82 at which the link 68 is connected to the intermediate crosspiece 48 and the pivot point 84 at which the link 66 is connected to the slide are all located along a common horizontal line. Therefore, it will be understood that as the jaws 26 and 28 move to their closed condition, the linkage which drives the jaws has a toggle action. This causes the velocity of each jaw to become zero as it reaches its fully closed position and thereby yields a smooth closing of the jaws with little or no bounce or impact. Also with the pivot axes in alignment during the closed condition of the jaws, as in FIG. 6, forces tending to open the jaws are reacted by forces passing through the crank axis 56 and, therefore, having no moment arm tending to rotate the crank. Thus, the cylinder 52 need exert only relatively little force to hold the jaws closed against much larger forces tending to open them.

When the jaws are to be moved from their closed to their open condition, the reverse procedure is followed. That is, starting from the closed condition of FIG. 6, the cylinder 52 is energized to withdraw its piston rod 70 and to thereby rotate the crank 53 in the counterclockwise direction until reaching the open condition of FIG. 4.

I claim:

1. In a package making machine, the combination of front and rear sealing jaws and a mechanism for moving said jaws relative to one another between open and closed conditions, said mechanism comprising a base, a slide supported for sliding movement relative to said base along a given axis, means fixing said front jaw to said slide for movement therewith, means slidably supporting said rear jaw for sliding movement relative to said slide along said given axis, said slide extending along said given axis from said front jaw toward and beyond said rear jaw to a point behind said rear jaw, two crank arms fixed relative to one another and supported for pivotal movement in unison about a crank axis generally perpendicular to said given axis and located behind said rear jaw, a first connecting link connected between one of said crank arms and said slide with its point of connection to said slide being located behind said rear jaw, and a second connecting link connected between the other of said crank arms and said supporting means for said rear jaw, the point at which said first connecting link is connected to said one crank arm and the point at which said second connecting link is connected to said other crank arm being located generally on opposite sides of said crank axis so that upon rotation of said crank arms about said crank axis said two jaws are slidably moved in opposite directions along said given axis.

2. The combination defined in claim 1 further characterized by said point at which said first connecting link is connected to said slide and the point at which said second connecting link is connected to said supporting means for said rear jaw being located on opposite sides of said crank axis.

3. The combination defined in claim 2 further characterized by said crank axis, said point at which said first connecting link is connected to said one crank arm, said point at which said first connecting link is connected to said slide, said point at which said second connecting link is connected to said other crank arm, and said point at which second connecting link is connected to said supporting means for said other jaw all being located at least substantially on a common straight line when said jaws are in their closed condition.

4. The combination defined in claim 2 further characterized by said crank axis intersecting said given axis.

5. The combination defined in claim 1 further characterized by said supporting means for said rear jaw being slidably supported on said slide.

6. The combination defined in claim 1 further characterized by a third crank arm fixed relative to said two crank arms for pivotal movement in unison with said two crank arms about said crank axis, and means connected with said third crank arm for reciprocatingly driving it and said two crank arms clockwise and counterclockwise about said crank axis.

7. In a package making machine, the combination of a pair of sealing jaws and a mechanism for moving said jaws relative to one another between open and closed conditions, said mechanism comprising a base, two parallel slide rods having front and rear ends, means engaged with said slide rods intermediate said front and rear ends thereof for slidably supporting said rods for movement relative to said base along a given axis, a front crosspiece extending between and fixed to said slide rods adjacent the front ends thereof, a rear crosspiece extending between and fixed to said slide rods adjacent said rear ends thereof, a front jaw connected to said front crosspiece and having a sealing face facing toward said rear ends of said slide rods, and intermediate crosspiece extending between said two slide rods and slidably supported at its opposite lateral ends by said slide rods so as to be slidably movable relative thereto along said given axis, said intermediate crosspiece being located between said front crosspiece and said support means, a rear jaw carried by said intermediate crosspiece and having a sealing face facing forwardly toward said front ends of said slide rods, two crank arms fixed relative to one another and supported for pivotal movement in unison about a crank axis which crank axis is generally perpendicular to said given axis and is located between said intermediate crosspiece and said rear crosspiece, a first connecting link connected between one of said crank arms and said rear crosspiece, and a second connecting link connected between the other of said crank arms and said intermediate crosspiece, the point at which said first connecting link is connected to said one crank arm and the point at which said second connecting link is connected to said other crank arm being located generally on opposite sides of said crank axis so that upon rotation of said crank arms about said crank axis said jaws are slidably moved in opposite directions along said given axis.

8. The combination defined in claim 7 further characterized by means for reciprocating said two crank arms in unison clockwise and counterclockwise about said crank axis.

9. The combination defined in claim 8 further characterized by said means for reciprocating said crank arms comprising a third crank arm fixed relative to said two crank arms for movement in unison therewith about said crank axis, and means connected with said third crank arm for driving it clockwise and counterclockwise about said crank axis.

10. The combination defined in claim 7 further characterized by said crank axis being arranged so as to substantially intersect said given axis.

11. The combination defined in claim 7 further characterized by first stop means fixed relative to said base and second stop means fixed relative to said two crank arms, said first and second stop means being coengageable to limit movement of said crank arms relative to said base in both directions of rotation of said crank arms about said crank axis.

12. The combination defined in claim 11 further characterized by said first and second stop means being arranged so that in the direction of rotation of said crank arms corresponding to closing movement of said two jaws, movement of said crank arms is limited to the position at which said crank axis, said point of connection of said one crank arm to said first connecting link, said point of connection of said first connecting link to said rear crosspiece, said point of connection of said other crank arm to said second connecting link, and said point of connection of said second connecting link to said intermediate crosspiece are all located substantially along a common straight line when said jaws are in their closed condition.

13. The combination defined in claim 7 further characterized by said crank axis, said point of connection of said one crank arm to said first connecting link, said point of connection of said first connecting link to said rear crosspiece, said point of connection of said other crank arm to said second connecting link, and said point of connection of said second connecting link to said intermediate crosspiece are all located substantially along a common straight line when said two jaws are in their closed condition.

* * * * *